April 14, 1970 R. A. MILLER ETAL 3,505,703
INSTALLATION OF INERTIAL DUST FILTER ON AIRPORT
RUNWAY AND/OR STREET CLEANING
Filed May 15, 1968 5 Sheets-Sheet 1

INVENTORS
EDWARD S. ISSENMANN
ROGER A. MILLER
BY
Charles H. W...
ATTORNEY

United States Patent Office 3,505,703
Patented Apr. 14, 1970

3,505,703
INSTALLATION OF INERTIAL DUST FILTER ON AIRPORT RUNWAY AND/OR STREET CLEANING EQUIPMENT
Roger A. Miller and Edward S. Issenmann, Dayton, Ohio, assignors to the United States of America as represented by the Secretary of the Air Force
Filed May 15, 1968, Ser. No. 729,330
Int. Cl. E01h 1/08; A47l 9/16
U.S. Cl. 15—340       3 Claims

ABSTRACT OF THE DISCLOSURE

An inertia operated surface cleaner and centrifugal dust separator having a mobile support with an upper closed low pressure compartment with an engine driven vacuum fan for exhausting the air from said compartment. A closed dust and debris collecting chamber is located under the low pressure compartment with a suction duct opening into the collection chamber with a debris deflector for deflecting debris and heavier particles discharged from said duct into said collecting chamber. A suction unit is carried by said support to traverse the surface to be cleaned, and is connected to the lower end of said suction duct. A plurality of cylindrical centrifugal or inertial dust separators are fixed in said low pressure compartment and screened dust and air mixture delivery conduits extend upwardly from said collection chamber tangentially into each of the centrifugal inertia dust separators to discharge the dust and air mixture from said chamber into the opposite ends of each of said centrifugal separators to whirl the air and dust mixture therein toward a transverse plane intermediate the ends of the separators to throw the heavier dust particles outward toward the inner surface and longitudinally toward the center of the separators. Clean air is withdrawn axially in the opposite directions from the ends of the separators by the low pressure in the surrounding low pressure compartment. An annular dust collection and delivery trough is located intermediate the ends of each of the separators receiving the inertially separated dust and has a tangential dust discharge conduit therefrom connected to dust ejection blower means with dust discharge conduit means discharging downwardly into the collection chamber, and a baffle plate for directing the separated duct downwardly into the collection chamber.

BACKGROUND OF THE INVENTION

Existing surface cleaners and dust and debris separators of the vacuum type usually have porous cloth bags for dust control. These cleaners have many disadvantages; among which are the bags needing periodic replacement; they require cleaning; they cannot be used in damp or wet weather; they are very bulky; easily damaged; they are expensive; and considerable time is lost in their replacement.

FIELD OF THE INVENTION

The invention comprises a mobile surface cleaner of the vacuum operated inertia type for use on airport runways and streets, or similar surface cleaning and dusting, for removing dust and other objectional debris, and small objectional particles from the surface being cleaned which might damage aircraft or aircraft landing equipment during the landing or "takeoff" operations thereof.

SUMMARY OF THE INVENTION

The invention is a mobile power operated surface cleaner of the "vacuum" operated type, which eliminates bags and similar dust collection means, and includes means for separating any of the heavier and larger debris and pebbles sucked into the apparatus with the dust and "outside" air, and employs inertia or centrifugal separator means located within a closed low pressure chamber for separating the dust from the dust and air mixture without the use of moving parts or porous bags, and includes means for returning the separated dust into a closed dust and debris collection chamber located under the low pressure chamber carried on a mobile support. A suction conduit is connected at its lower end to a suction unit that is connected to the mobile motor driven support for traversing the surface to be cleaned. The upper end of this suction conduit discharges into the upper portion of the closed dust and debris collection chamber. An inclined baffle fixed in front of the discharge end of said suction conduit deflects any sucked up heavier particles or debris downwardly toward the bottom of the collection chamber. The top of the closed collection chamber has a plurality of screened dust and air mixture intake ports therethrough extending upwardly and tangentially into the opposite ends of a plurality of fixed centrifugal inertial dust separators with no moving parts, and fixed on the bottom of the upper closed low-pressure separator containing chamber, to whirl the dust and air mixture within the separators from the opposite ends thereof toward the center. The separators each include a peripheral dust collection trough located intermediate their ends. A tangential dust discharge conduit extends from said trough to a dust ejection blower with a dust discharge conduit therefrom for discharging the separator dust downwardly into the collection chamber. A vertical baffle extends across the collection chamber and downwardly beyond the lower ends of the dust discharge conduits from the blowers to direct the blower discharge downwardly toward the bottom of the collection chamber.

Figure 1:
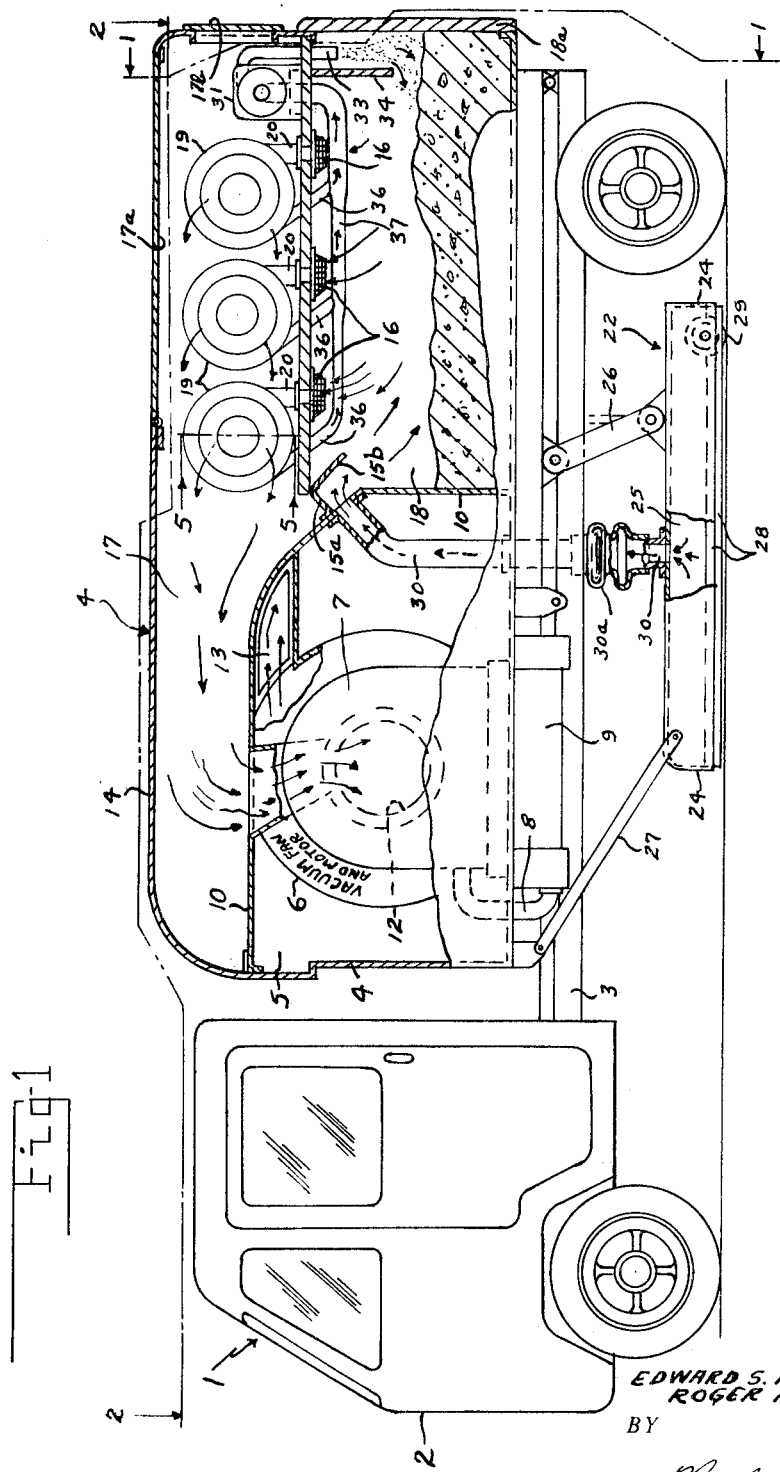
FIGURE 1 is a vertical longitudinal sectional view of a mobile inertial dust separator for airport runways, and or street cleaning equipment, somewhat schematically illustrating the invention, portions thereof being shown in elevation.
Figure 2:
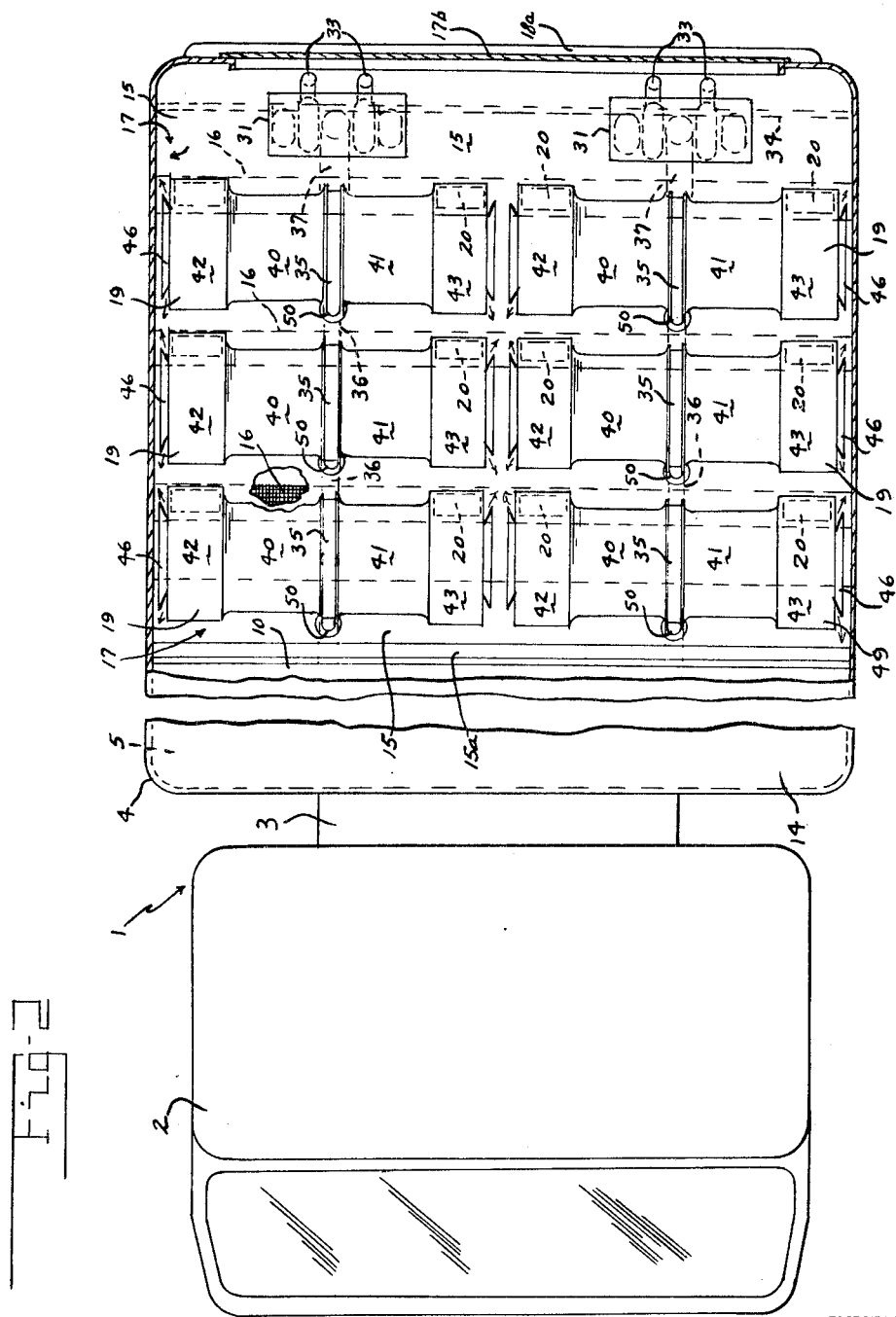
FIGURE 2 is a horizontal sectional view taken about on the plane indicated by line 2—2 in FIGURE 1 showing a portion of the top of the closed low-pressure compartment broken away to show the group of the centrifugal inertial dust separators.

Referring to the drawings, and more particularly FIGURE 1, the reference numeral 1 denotes a mobile support generally, preferably in the form of a somewhat conventional motor driven truck or chassis having a "cab" 2 for the driver and a supporting frame 3 on which the improved inertial surface cleaner, incorporating the invention, is mounted or carried.

The improved debris and dust inertia separator of the subject invention comprises a closed housing indicated generally at 4, having a closed forward compartment 5 containing a motor driven vacuum fan or suction unit driven by a suitable power plant, for instance a gas engine 7 having a suitable exhaust pipe 8 therefrom discharging into a conventional engine muffler 9.

The upper portion of the partition 10 surrounding the suction fan and motor unit 6 and 7 has a suction inlet 11 and passage leading downwardly into the central suction inlet 12 of the vacuum or impeller fan casing 6.

The discharge from the fan 6 is exhausted to the exterior of the housing 4 by any suitable exhaust port or ports, for instance, side exhaust ports 13 in the opposite side walls of the casing or housing 4. If desired the fan discharge or exhaust passage 13 may extend upwardly through the top or roof 14 of the housing.

A horizontal platform or support 15, together with a stone and larger debris deflecting baffle 15a (later referred to) divides the closed housing 4 into an upper, low pressure compartment 17 from which air is withdrawn through the suction inlet 11 by the vacuum fan 6, and into a low pressure closed lower dust and debris receiving and collecting chamber 18.

Mounted in fixed relation on the supporting platform 15 are a plurality of centrifugal or inertial dust separators indicated generally at 19 (later to be described in detail).

The inertial dust separators 19 have no moving parts and have dust and air intake passages 20 extending upwardly through the supporting platform 15 and tangentially into the sides of two opposite ends of each of the separators for discharging the dust and air mixture from the upper portions of the lower dust and debris collecting chamber 18 tangentially into the separators 19.

Suitable trough shaped screen members 16 extend substantially entirely across the bottom of the supporting platform 15 to cover the inlet openings and passages 20 extending tangentially into the ends of the inertial separators 19. These screens 16 have a predetermined size "mesh" to prevent any stones, debris or particles larger than the mesh openings from entering the inertia separators 19. Since there are three groups of two separators each, disposed in spaced parallel relation between the opposite side walls of the housing 4, and each separator has two spaced tangential dust and air circular passages, one at each of its opposite ends, each of the screens 16 therefore covers four of the inlets 20 and provides sufficient screen means between the suction inlet ports and passages 20 to prevent clogging, and additionally prevent larger particles such as stones from passing, but will allow any dust and air mixture from the collection chamber to freely pass into the opposite ends of the separators 19.

A vacuum or suction dust and debris pickup unit, indicated at 22 is suspended below the chassis or frame 3 for travel in closely spaced relation to the surface or runways to be cleaned. This suction unit 22 may be of any suitable or conventional design and is disposed between the front and rear wheels of the truck or vehicle 1, and extends across under the vehicle substantially from side to side thereof, for instance similar to the suction unit 22 as seen in Patent No. 3,007,191 to H. Braun, entitled "Automatic Sweeping Machine for Runways, Streets, Roads and the Like."

Figure 3:
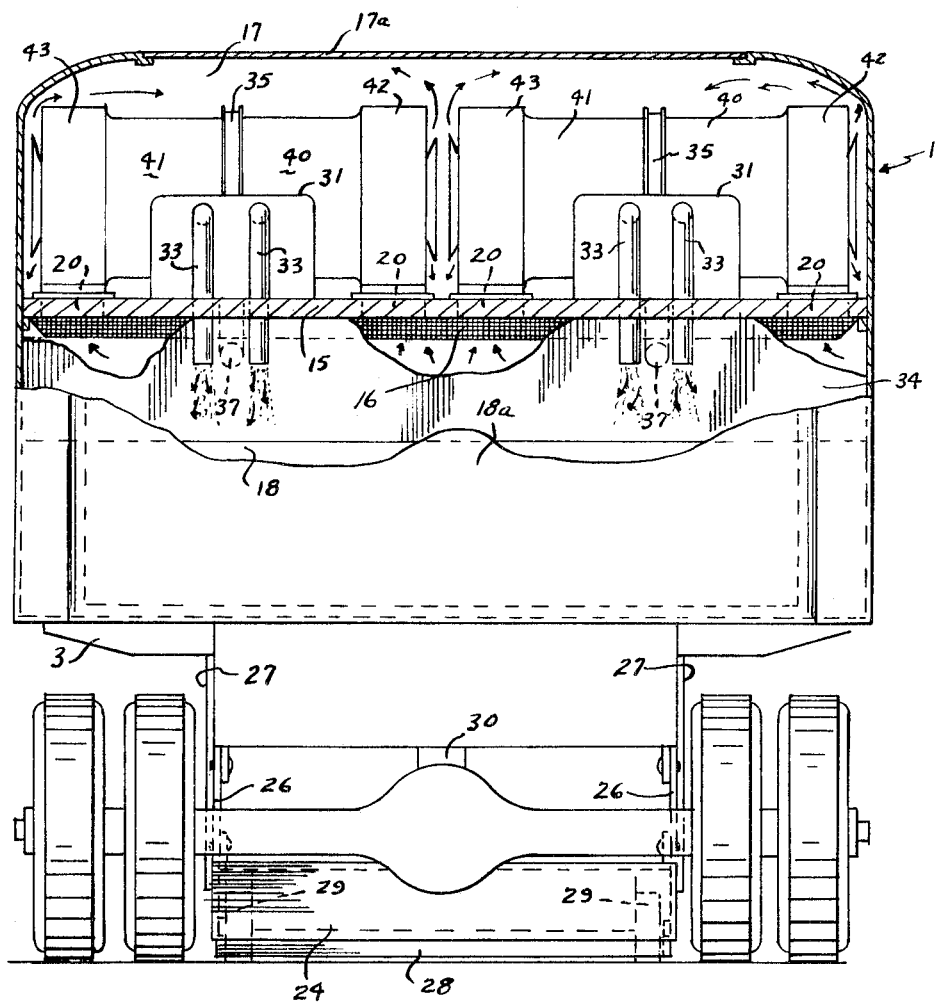
FIGURE 3 is a vertical cross-sectional view taken through the rear end portion of the dust cleaning apparatus about on the plane indicated by line 3—3 in FIGURE 1, portions thereof being shown in elevation.

For sake of simplicity, as shown in the drawing in FIGURES 1 and 3, the conventional internal mechanism of the suction device 22, such as the motor sweeper and pickup brushes, etc., as shown in the Braun Patent 3,007,191, have been omitted.

As shown in FIGURES 1 and 3 the vacuum unit or suction pickup device 22 comprises a rectangular suction compartment having a top 23 with end and side walls 24 and 25 and is suspended above the surface to be cleaned by suitable adjustable links 26 and 27. A rubber gasket or strip 28 may extend around the lower edges of 22 and down in close proximity to the runway surface to be cleaned. Suitable rollers 29 may also be provided to maintain a desired clearence of the suction unit 22 above the surface being cleaned.

A debris, dust and air suction conduit 30 is connected at its lower end in communication with the interior of the suction or vacuum unit 22, and passes upwardly through the exhaust fan and engine compartment 5 and through the wall or partition 10 and has a discharge outlet located behind the deflector baffle 15a. This deflector 15a extends between partition wall 10 and the front end of the platform 15 and has a downwardly inclined stone and larger debris deflecting flange 15b for deflecting stones and larger debris and particles discharged through the suction pipe 30, downwardly toward the bottom of the chamber 18. The suction pipe 30 preferably has an intermediate flexible hose portion 30a to provide for relative adjustment and yielding movement in the pipe 30 between the end thereof which is fixed in the suction fan and motor compartment, and the lower end that is fixed to the suction unit 22.

The lower dust and debris collection chamber 18 may have a suitable cleanout door 18a in the rear end thereof. Also the upper or low pressure chamber 17 is preferably provided with suitably located access doors or panels in the top and rear end walls thereof as indicated at 17a and 17b to provide access to the separators 19, and to the dust ejector blower and motor units 31 (later to be described in more detail). However, these duct ejecting fan and motor units 31 may be conventional, motor driven centrifugal or vacuum impeller fan units having central suction inlets 32 which are connected to the inertial dust separators 19 for withdrawing the separated dust from the separators, and peripheral exhaust conduits or ducts 33 which extend downwardly through the supporting platform 15 into the rear end of the dust and debris collecting chamber 18. Other methods of dust ejection, including air driven ejector systems, may be used.

A downwardly extending vertical dust deflector baffle plate 34 extends across the rear portion of the collection chamber 18 and below the lower end of the dust discharge ducts 33 to direct the dust discharged by the blower units 31 toward the bottom portion of the chamber 18.

Each of the intertial separators 19 has an annular or circular dust collection channel or trough 35 intermediate its ends which is provided with a tangential dust discharge passage or conduit 36 which as shown inclines downwardly and rearwardly through the supporting platform 15. These dust discharge conduits 36 from the three separators 19 on each side of the low pressure compartment 17 incline as shown through the supporting platform 15 and are connected in communication with common dust discharge headers or manifolds 36 which extend under the platform 15 and the screens 16, substantially as shown in FIGURE 1, with the discharge end of each of these manifolds 36 extending upwardly, and discharging into the center of one of the centrifugal dust blowers 31 which discharges the separated dust downwardly into the collection chamber 18.

Figure 4:
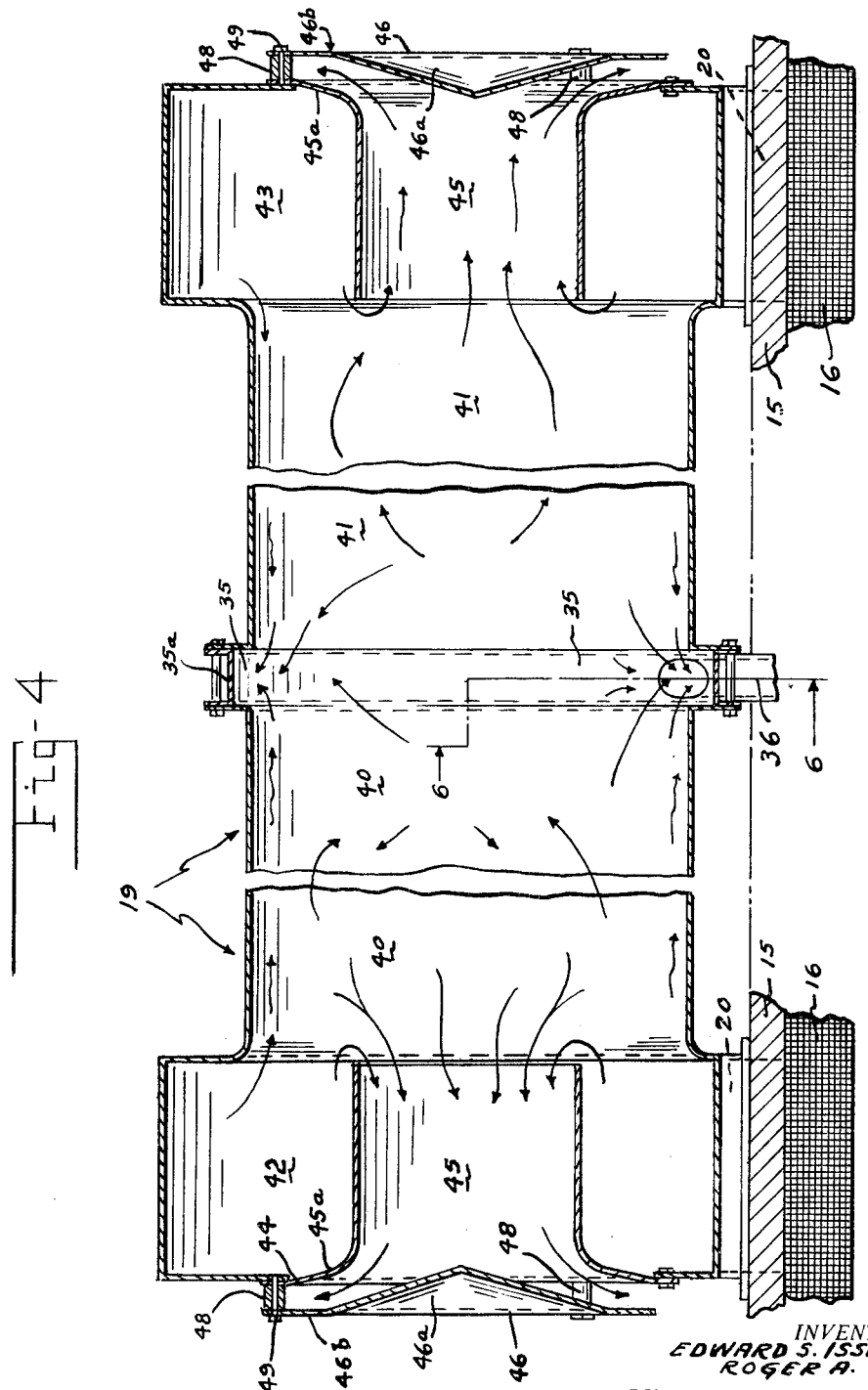
FIGURE 4 is a vertical longitudinal sectional view through one of the inertial dust separators by itself, taken about on the plane indicated by line 4—4 in FIGURE 1.
Figure 5:
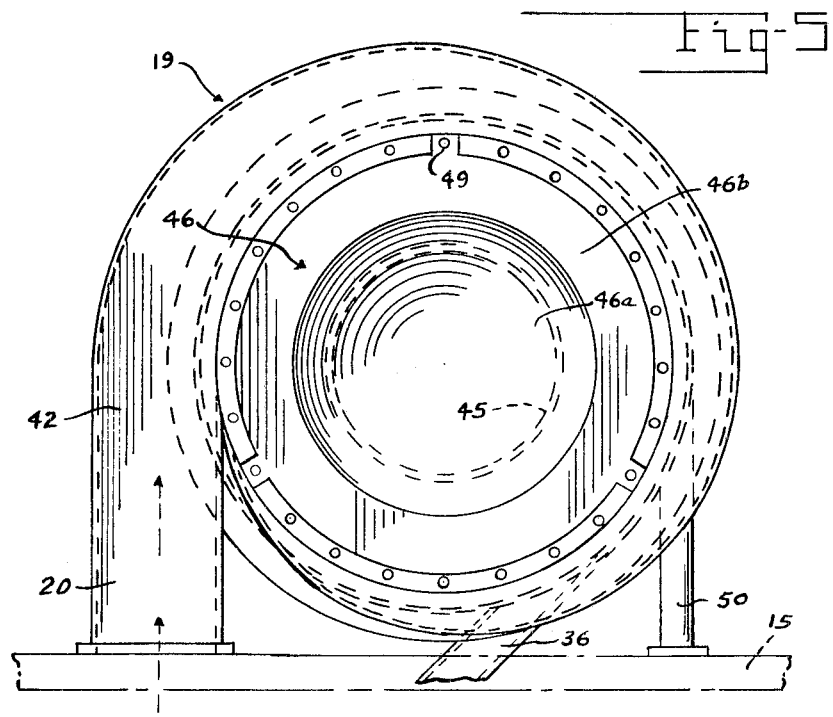
FIGURE 5 is an end view of the inertial separator shown in FIGURE 4, looking toward the left hand end thereof.
Figure 6:
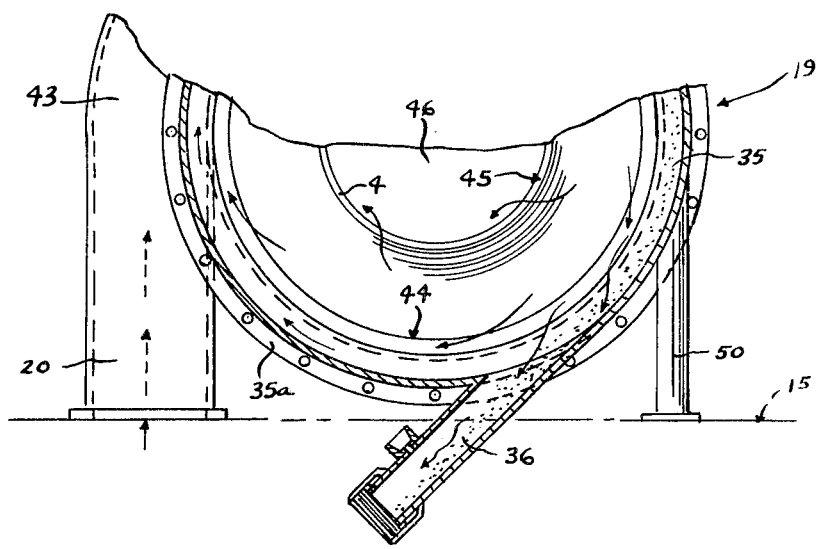
FIGURE 6 is a transverse sectional view taken about on the plane indicated by line 6—6 in FIGURE 5, looking in the direction shown by the arrows.

Referring more particularly to FIGURES 4, 5 and 6, the inertial dust separators each comprise a left-hand cylindrical swirl section 40 and a right-hand cylindrical swirl section 41. These sections 40 and 41 are flanged outwardly at their adjacent ends and are secured to each other in spaced relation by an outwardly flanged intermediate cylindrical U-shaped member 35a of larger diameter than the diameters of the swirl sections. This construction constitutes the annular dust collecting trough member 35 between the swirl sections of greater diameter than the diameter of the swirl sections and has the tangential dust discharge duct or conduit 36 fixed thereto which inclines downwardly and rearwardly through the supporting platform 15, as previously noted.

The outer ends of the swirl cylinders or sections 40 and 41 are each formed with an enlarged eccentric dust and air inlet swirl chamber 42 and 43 that is formed with the tangential dust and air mixture intake conduit 20 to receive the dust and air mixture from the dust and debris collecting chamber passing through the transverse trough shaped screens 16, under the influence of suction or low pressure in the upper low pressure compartment 17 containing the separators, and by the withdrawal of air from the outer ends of the separators caused by the suction fan unit 6.

The outer ends of the "tangential" or eccentric dust and air swirling chambers 42 and 43 each have a central circular clean air discharge opening 44 therein which is concentric to the axis of the swirl cylinders or sections 40 and 41. An inner cylindrical concentric tubular clean air discharge member 45 is fixed in each of the openings 44 which member 45 is formed with an outwardly flared annular supporting flange 45a that is secured to the outer wall of each of the eccentric chambers 42 and 43 at the edges of the openings 44 therein. These tubular clean exit air members or diffusers 45 extend inwardly into the eccentric shells 42 and 43 to approximately a transverse plane through the junctures between the larger eccentric end shell members 42 and 43 and the outer ends of the cylindrical sections 40 and 41.

Spaced outwardly from the outer flanged ends of each of the clean air discharge members 44 and 45 is a circular diffuser plate 46 having an inwardly projecting conical central portion 46a, with a surrounding annular flat peripheral portion 46b which is secured in outwardly spaced relation to the outer ends of the peripheral portions 45a of the diffusers 45 by the spacer sleeves 48, with bolts 49 extending therethrough.

The inertial dust separators are supported in fixed relation above the platform 15 at one side thereof, by the spaced tangential dust and air mixture intake ducts or nozzles 20, and supported at their other sides by the supporting standards 50.

Briefly describing the operation of the invention, assuming that the motor 7 is driving the exhaust or vacuum fan 6 to exhaust the air from the enclosure 17, and the device or mobile support is traversing a runway or surface to be cleaned, with the surface cleaning suction pickup unit 22 in operative position, substantially as shown in FIGURE 1, air is withdrawn from the upper or lower pressure compartment 17 and discharged or exhausted through the exhaust fan and side discharge ports 13 to the exterior of the machine. This creates a low or sub-atmospheric pressure in the upper, inertia dust separator compartment 17 containing the multiple inertia cleaning or dust separator units 19.

Air withdrawn from the opposite ends of the separator units 19, as seen in FIGURE 4, between the diffuser plates 46 and the ends of the eccentric shells 42 and 43 through the circular openings 44 creates a central or axial low pressure area or "core" through the concentric cylindrical clean air discharge shells 45 to cause air and dust to be drawn upwardly from the dust and debris collection compartment 18, through the trough shaped screen members 16, and discharged with considerable force and velocity tangentially into the periphery of the eccentric shells 42 and 43, to cause the air and dust to be swirled axially from the opposite ends of the separator units 19 toward the intermediate concentric annular dust collecting trough 35 by the cylindrical inwardly extending portions of the clean air discharge shells 45.

The air and dust mixture is swirled circumferentially and moved axially from both ends of separator units toward the centers to throw or separate the heavier dust from the lighter air by centrifugal force and inertia to cause the outer portion of the swirling column containing dust to move axially into the intermediate circular dust collection and discharge trough 35, from which it is drawn tangentially through the discharge pipes 36 and 37 by the dust ejection suction blowers 31, and discharged therefrom into the lower dust and debris collection chamber 18. The separated cleaner inner or central lighter air column from which dust and the heavier particles have been removed by the inertial or centrifugal forces is withdrawn by reverse air flow around the inner ends of the cylindrical fresh air discharge shells 45 and drawn out into the low pressure upper compartment 17 by the suction fan 6, and discharged out of the inertia sweeper through the exhaust ports 13 to the exterior.

Of course, as the sweeper traverses the surface to be cleaned, the dust, stones and debris on the surface which are sucked up through the conduit 3 from the interior of the cleaning suction unit or "nozzle" 22 and discharged at the upper end of the conduit (or conduits) 30 toward the inclined baffle plate 15b cause a deflection of the heavier and larger particles and debris downwardly toward the bottom of the collection chamber 18. The larger particles will not pass the screen and are prevented from entering the inertial dust separators 19 but only the dust and very light smaller particles will pass through the screens 16 with the air that is drawn into the surface cleaning or suction unit 22, can reach the inertia separators 19.

Suitable mechanical or hydraulic elevating and lowering means may be provided for raising or lowering the suction unit 22 relative to the surface on which the device is supported or operating.

For purposes of exemplification, a particular embodiment of the invention has been shown and described to the best understanding thereof. However, it will be apparent that changes and modifications in the arrangement and construction of the parts thereof may be resorted to without departing from the true spirit and scope of the invenion as defined in he following claims.

I claim:

1. An inertial dust separator surface cleaning apparatus comprising a mobile support for travel over a surface to be cleaned, a closed low pressure housing carried by said mobile support, having an upper lower pressure inertial dust separator compartment and a lower closed low pressure dust and debris collection chamber, power means for exhausting air from said upper low pressure inertial dust separator compartment to maintain a low pressure therein, a plurality of inertial dust separtors fixed in said upper low pressure compartment each having tangential dust and air mixture inlet means at the sides of the opposite ends thereof and central clean air outlets in said ends, screened conduit means connected between said lower dust and debris collection chamber and said tangential dust inlet means, an annular dust collecting trough means fixed in each of said inertial dust separator means intermediate the opposite outer ends thereof having a tangential dust outlet conduit therefrom, vaccum fan dust suction and blower means in said low pressure housing connected to said tangential dust outlet conduit for removing dust from said tangential dust outlet conduit and discharging the same into said dust and debris collection chamber, a dust and debris pickup suction unit carried by said mobile support to traverse the surface to be cleaned in close relation thereto, suction conduit means connected between the interior of the upper portion of said dust and debris collection chamber and said suction unit, responsive to the lower pressure in said dust and debris collection chamber, for sucking dust and debris from the surface being cleaned and traversed by said suction unit and mobile support, and discharging said dust and debris sucked up through said suction unit into said collection chamber.

2. An inertial surface cleaning apparatus comprising a mobile support for travel over the surface to be cleaned, a closed housing carried by said mobile support having a closed upper low pressure dust separator compartment and a lower closed low pressure dust and debris collection chamber, power means for exhausting air from said upper compartment to maintain a low pressure therein, a cylindrical inertial dust separator fixed in said upper compartment having tangential dust and air mixture inlet means in the sides of the opposite ends thereof, suction conduit means connected between said lower chamber and tangential dust and air mixture inlet means, circular dust collecting trough means in said inertial dust separator means intermediate the opposite ends thereof having a tangential dust discharge outlet conduit therefrom, vacuum fan and dust blower means having a suction intake conduit therefrom connected to said tangential dust discharge outlet and a dust discharge conduit from said vacuum fan and dust blower means extending into said low pressure dust and debris collection chamber for discharging dust into said dust and debris collection chamber, a surface cleaning suction unit carried by said support to traverse the surface to be cleaned, suction conduit means connected between the upper portion of said dust and debris collection chamber and the interior of said suction unit responsive to the lower pressure in said dust and debris collection chamber for sucking dust and debris from the surface being cleaned to discharge said dust and debris into said dust and debris collection chamber.

3. An inertial dust separator and dust and debris removing and cleaning apparatus for cleaning runways, streets and the like comprising, a mobile support disposed for travel on and over the surface to be cleaned, a closed housing carried by said mobile support comprising a closed forward compartment, a closed low pressure dust and debris collection chamber, and a superimposed lower pressure inertial dust separator compartment, power operated suction fan means in said closed forward compartment for withdrawing air out of said inertial separator compartment to maintain a low pressure therein, a plurality of cylindrical centrifugal inertial dust and air separators fixed in said inertial separator compartment, each separator having an eccentric circular dust and air mixture intake section at its opposite ends each intake section having a central clean air discharge opening for discharging a central column of separated clean air out of the opposite ends of each separator into said low pressure separator compartment, said eccentric circular sections each having tangential dust and air mixture intake openings into the sides thereof including connected dust and air mixture delivery conduits from said dust and debris collection chamber for swirling the dust and air mixture received from said dust and debris collection chamber around the interior of the cylindrical inertial separator from the opposite ends of each separator toward the center thereof to centrifugally and inertially separate the heavier dust from the dust and air received mixture to separate and withdraw the cleaner air out of the centers of the ends of the separators into the separator compartment, a circular dust receiving and discharging trough fixed in each separator intermediate the opposite ends thereof having a greater inner diameter than the internal diameter of the adjacent cylindrical portions of the separator, for receiving the centrifugally separated dust thereinto and having a tangential dust discharge pipe therefrom, a power driven dust ejection suction unit connected to said dust discharge pipe having a dust discharge conduit therefrom extending into said dust and debris collection chamber for discharging dust into said chamber, debris deflecting screen means fixed in said dust and debris collection chamber and covering said dust and air mixture delivery passages to said separators, to prevent the passages of debris and stones exceeding a predetermined size from being drawn into said separators, a debris and dust suction pickup unit adjustably fixed below said dust and debris collection chamber for traversing the surface to be cleaned in predetermined close relation thereto, dust and debris suction conduit means connected at its lower end in communication with the interior of said suction unit and extending upward into the upper portion of said dust and debris collection chamber, a downwardly inclined stone and debris deflector means fixed in said collection chamber in front of the discharge end of said dust and debris suction conduit for deflecting stones and larger and heavier debris downwardly toward the bottom of said dust and debris collection chamber.

References Cited

UNITED STATES PATENTS

| | | | |
|---|---|---|---|
| 447,333 | 3/1891 | Kutsche | 55—349 |
| 2,575,607 | 11/1951 | Wallin | 55—349 X |
| 2,932,845 | 4/1960 | Rydberg | 15—340 |
| 3,379,011 | 4/1968 | Von Ohain et al. | |
| 3,426,509 | 2/1969 | Wilhelmsson | 55—349 |

ROBERT W. MICHELL, Primary Examiner

U.S. Cl. X.R.

15—347